July 27, 1965
M. G. ROBINSON ET AL
3,197,533
GEL AND FISH-EYE REDUCTION IN THERMOPLASTICS
Filed Dec. 26, 1961
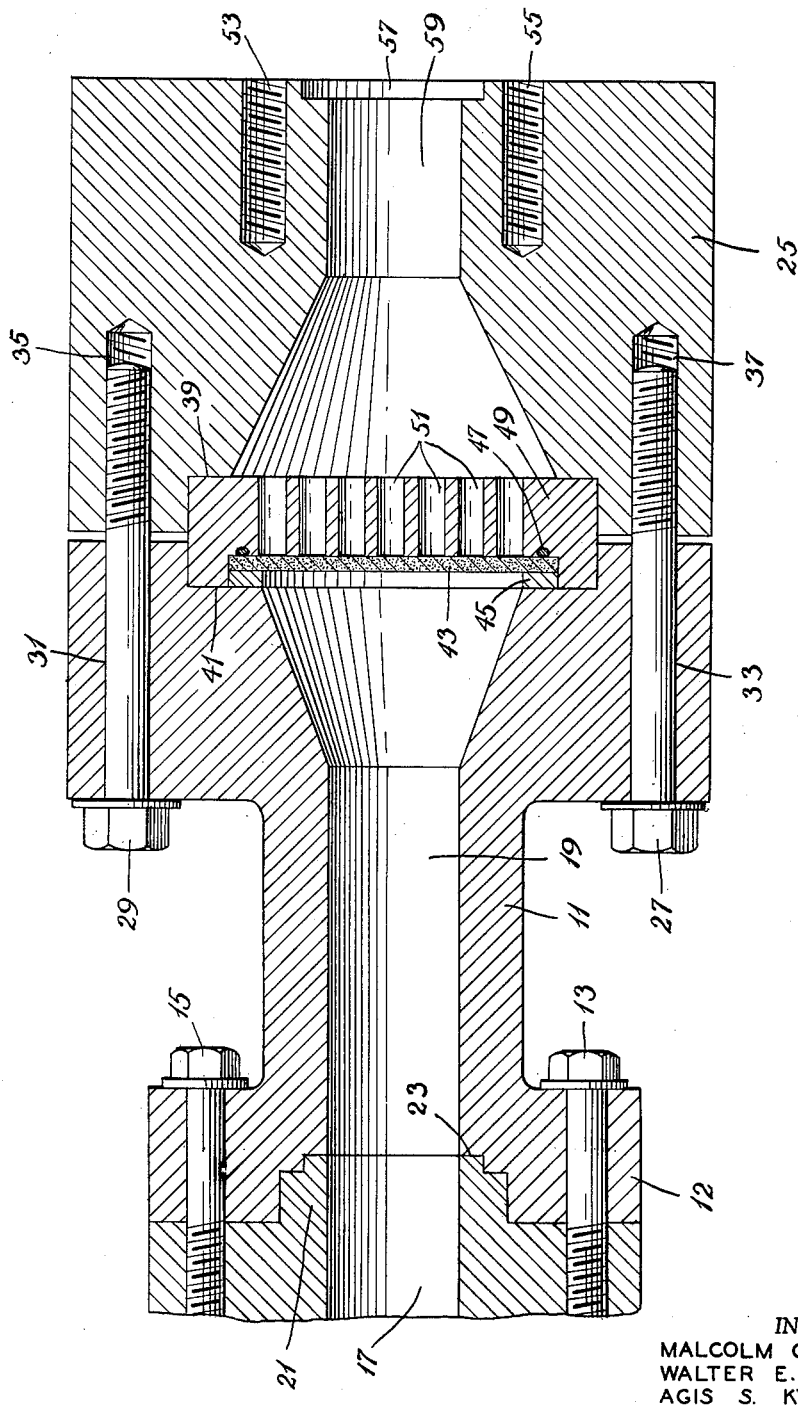
INVENTORS
MALCOLM G. ROBINSON
WALTER E. ZAVITZ
AGIS S. KYDONIEUS
BY *Walter C. Kehm*
ATTORNEY

United States Patent Office 3,197,533
Patented July 27, 1965

3,197,533
GEL AND FISH-EYE REDUCTION IN
THERMOPLASTICS
Malcolm G. Robinson, Westfield, Walter E. Zavitz, Somerville, and Agis F. Kydonieus, Somerset, N.J., assignors to Union Carbide Corporation, a corporation of New York
Filed Dec. 26, 1961, Ser. No. 162,255
4 Claims. (Cl. 264—176)

This invention relates to the production of films and other shaped thermoplastic articles and more particularly to an improved process and apparatus for the production of shaped thermoplastics which are substantially free from visual fish-eyes and gel particles.

It has long been desired to obtain film and other shaped thermoplastic articles that are substantially free from visual inhomogeneities such as gel particles, fish-eyes, and other cross-linked polymeric residue. These resin particles are portions of polymer which have a higher molecular weight than the surrounding polymer mass or are the result of two or more polymer molecules cross-linking. These particles do not blend with the surrounding resin during processing and appear as clear, translucent, or opaque spots in the finished product. Such inhomogeneities can cause decreased process efficiency, down-grading of product, and decreased saleability due to the unsightly appearance of the product.

Modifications in various thermoforming processes such as extrusion and injection molding have previously been made in attempts to overcome the undesirable appearance of gel-containing thermoforming products. Basic design changes in the apparatus have been contemplated; however, due to the complex interplay of the elements involved, a gain in one direction has often been counteracted by multiple losses in another. For instance, changing the design of the extruder screw to increase the shear rate and thereby obtain greater homogenization, necessarily leads to high heat loss from the thermoplastic itself which consequently necessitates a good deal of additional cooling capacity in the apparatus. Power requirements also increase in order to obtain a greater shear rate. Thus, it is seen that basic changes in design, while helpful in some aspects, can often result in additional equipment and subsequent economical losses in operation.

Other process modifications have been previously made in an attempt to reduce the inhomogeneities appearing in the final product to such a level as to essentially escape visual detection. Most prevalent efforts have been directed to "filtering out" the gel particles by means of suitable screens interposed between the nozzle and die of conventional thermoforming systems. However, it has been found extremely difficult by this means alone to eliminate or reduce the problem of inhomogeneities appearing in the product.

Wire mesh screens and filter packs consisting of sand granules have heretofore been extensively used. However, the incorporation of such filtering means in conventional equipment has been found to decrease process efficiency because of the necessity of frequent changes of the filter due to "plugging" of the interstices of the filter by the gel particles and also because of the variable throughput rate that results from any deformation of the filter. At the conditions necessary to force the molten thermoplastic through these screens, deformation of the screen is a constant hazard.

It is commonly known that to be effective, wire mesh screens should have mesh sizes in the range of about 50 to 300 mesh. As the upper limit is approached, higher shear rates are necessary to avoid "plugging" the interstices of the screen. Also, in order to prevent undue restriction, the diameter of the wire should not exceed the width of the screen openings. In a screen of sufficiently fine mesh to filter gel particles, the wire must be so small in diameter that much of the strength of the screen is lost. Loss of strength in the screen becomes critical at the high shear rates needed to avoid clogging in such fine interstices, as deformation of the screen is apt to result. If such deformation occurs, the throughput rate would be reduced to the point where the process would be impractical. Since the most efficient filtering is effected at these higher mesh sizes, it is usually necessary to operate the extruder screw at comparatively high peripheral speed in order that the necessary high shear rate be obtained. However, in conjunction with high shear rates come the additional problems of high heat dissipation and lower economy of operation as have been hereinbefore discussed. Therefore, it is clearly seen that the desirable results obtained at high mesh sizes are precluded by the concurrent disadvantages associated therewith.

Filter packs comprised of granules of sand have also been used in place of wire mesh. Conventional sand packs have equivalent mesh sizes of about 40 to 100 mesh. It can be readily seen that such mesh sizes are comparatively low, however, higher mesh sizes would slow up the filtration rate excessively. Higher pressures would have to be used to maintain operating efficiency at these higher mesh sizes but such measures are virtually inapplicable to sand packs due to the possible deformation or shifting of the granules of sand under high pressure forming voids in the pack which would impair the filtration efficiency of the pack. Even at normal operating pressures, care must be exercised to avoid shifting of the granules during operation. Here, as in wire mesh screen, "plugging" of the sand pack by the gel particles results in variable throughput and necessitates frequent pack changes.

Consequently, the use of conventional screening means, while providing some improvements in the appearance of the product, are hindered by the concurrent disadvantages of high shear rate, high heat dissipation, and process inefficiency due to continual "plugging" and variable throughput.

Accordingly, it is an object of the present invention to provide a continuous process for producing films which are substantially free from visual fish-eyes and gel particles.

It is another object of the present invention to overcome the disadvantages which have heretofore existed in refining shaped thermoplastic articles, viz., high shear rates, high heat dissipation, and variable throughput due to "plugging."

It is still another object of the present invention to provide an apparatus to be used in conjunction with conventional thermoforming processes which will produce shaped thermoplastic articles that are substantially free from visual fish-eyes and gel particles.

These and other objects of the present invention are accomplished in conjunction with a conventional injection molding or extrusion process wherein a gel-containing thermoplastic, prior to its contact with a shaping nozzle, is forced, under high pressure, through the capillaries of a rigid, noncompressible, metallurgically bonded, microporous metallic bed, said capillaries having a critically defined pore diameter and capillary length, thus producing a product substantially free from visual fish-eyes and gel particles.

It has now been found that commercially acceptable films and other shaped thermoplastic articles which are substantially free from visual fish-eyes and gel particles can be produced by forcing molten thermoplastic under high pressure through the capillaries of one or more rigid, noncompressible, metallurgically bonded, microporous, metal plates of critical dimensions interposed between the nozzle and die of a conventional extrusion or injection molding system whereby the gel particles or fish-eyes which are larger than the capillary openings are reduced to micron size thereby escaping visual detection in the final product.

A preferred embodiment showing the apparatus of the present invention is presented in the accompanying drawing wherein, FIG. 1 is a cross sectional view showing the sintered metal plate mounted in a conventional extrusion apparatus.

Referring now to the drawing,

A flanged tube 11 is fastened to the face plate 12 of a conventional extruder nozzle (shown in part) by means of bolts 13 and 15. To align the passageway 17 of the extruder nozzle with respect to the passageway 19 of the flanged tube 11, the face plate 12 has a protruding annular boss 21, which boss 21 is adapted to be received in seat 23 in the flanged tube 11. A centrally bored cap member 25 is bolted to the adjacent flange of the tube 11 by means of a plurality of threaded bolts partially shown as 27 and 29 that extend through apertures 31 and 33 into engagement with internally threaded apertures 35 and 37 in the cap member 25. The flanged tube 11 and cap member 25 have complementary concentric recesses 39 and 41 to receive the sintered metal plate 43 which is held in place on the inlet side by means of a seal ring 45 which is positioned in recess 41. On the outlet side, the sintered metal plate 43 is sealed by means of steel O ring 47 positioned in the flanged portion of breaker plate 49 having a plurality of apertures 51 extending therethrough which supports the sintered metal plate 43. The front face of cap member 25 is provided with internally threaded apertures 53 and 55 for securing the projecting boss (not shown) of a conventional extruder die. A seat 57 concentric with the central bore of cap member 25 is adapted to receive the protecting boss (not shown) of said extrusion die, thereby aligning the passageway 59 of the cap member 25 with the entrance to the extruder die (not shown). As the thermoplastic material being extruded flows through the extruder nozzle, it passes under high pressure, i.e., at least about 5,500 p.s.i. through the sintered metal plate 43 having a pore size between about 2 to 35 microns and effective capillary length between 0.05 and 0.60 inch, interposed as hereinabove described between said extruder nozzle and the extruder die whereby the gell particles are reduced to micron size thus, assuring a product substantially free from visual fish-eyes and gel particles.

While not wishing to be bound by any theory of mechanisms, results have indicated that the gels or fish-eyes are reduced to micron size by shear during passage through a very tortuous path of micron size capillaries. However, unlike most other conventional methods of refining resins, the method of shearing in the present invention is unique in that no high shear rates are required. The shear rates required to break-up the gel particles in the individual capillaries are very small, i.e., in the order of about 100 to 150 sec.$^{-1}$, which are much lower than in most other conventional devices used to reduce inhomogeneities in thermoplastics. Conventional shear rates are in the range of about 1,000 to 10,000 sec.$^{-1}$.

Because of the large reduction in shear rate, high heat generation is substantially eliminated. The main disadvantages that previously prohibited effective reduction of gel particles are thereby eliminated by using the metallurgically bonded or sintered metal plate of the present invention.

High pressure is required to force the warm, elastic fish-eye or gel particle through the smaller capillaries of the bed. Upon entering the capillary, the fish-eye is elongated and continued high pressure causes the fish-eye to deform until its elastic limit is exceeded and it breaks in two. This reduction process continues until the gel or fish-eye particles are the size of the capillary openings.

Confirmation of the proposed mechanism of preferential size reduction of fish-eyes and gel particles by shear caused by passage through a very tortuous path of micron-size capillaries has been obtained by observation of repeated experimental tests which showed:

(1) Continuous operation over 24-hour periods showed no changes in the throughput rate or pressure.

(2) Microscopic examination on random samples of film revealed fish-eyes of micron size which on visual examination presented no quality problems.

(3) Samples originally containing a high percentage of fish-eyes were processed without "plugging" the plate or causing an increase in pressure.

Herein lies the basic difference between prior conventional methods and that of the present invention. The problems associated with prior screening devices can be mainly attributed to the fact that heretofore most operations for removal of gel particles was accomplished by filtration. It can now be shown that these problems are substantially eliminated by the methods of the present invention-wherein a rigid, non-compressible, metallurgically bonded metal plate interposed between the nozzle and die of a conventional thermoforming system operates not as a filter but as a preferential size reducer, e.g., the molten thermoplastic mass plus any gel particles already of micron size and therefore imperceptible in the final product pass through the sintered plate unaffected; however, those particles larger than the critically defined pore openings are broken down to micron size by a shearing operation conducted within the capillaries of the plate. Unlike conventional methods, that of the present invention does not involve high shear. It is important to realize that due to the high pressures involved, the mechanism is one of size reduction whereas if lower pressures were used, merely filtration would be accomplished. Therefore, it can readily be seen that to accomplish the novel results of the present invention, the three factors of pressure, capillary pore opening, and effective capillary length must be strictly adhered to, otherwise, filtration and its concomitant disadvantages result.

Metallurgically bonded or sintered metal has been found to be advantageously adaptable to this process of fish-eye or gel reduction. Sintered stainless steel has been found to be especially adaptable to the present invention. The tortuous path afforded by the sintered metal effectively increases the capillary length to one which is greater than the measurable depth of the noncompressible bed.

The sintered metal plate can be formed by depositing metal or alloy powder in a flat layer of uniform thickness. The particle size range of the powder can be selected to provide the desired final pore size. No binder need be used at any stage of the process. The layer of powder is placed in a furnace wherein it is subjected to a temperature just below the melting point of the metal or alloy. Bonds develop at points of contact between adjacent particles probably due to migration of layers of atoms. The finished porous metal sheet can then be removed from the furnace and allowed to cool.

Various designs of the sintered metal bed may be used to adapt to different types of process equipment and to obtain a more favorable ratio of material processed to filtering area. As a result, the present invention is not restricted to a particular form of bed. It is also possible to use a combination of sintered metal plates having different pore sizes, e.g., one element having an average capillary opening of 5 microns and another with an average opening of 10 microns.

It is considered critical that the capillary pore openings be of micron sizes between about 2 to 35 microns in order that the capillary openings be smaller than the size of the fish-eye or gel particles in the molten thermoplastic. Otherwise the gel particles, being rubbery-like, can deform enough to pass through the bed without breaking.

Because of the micron size of the capillary pore openings, high pressures in the range of about 5,500 to 10,000 p.s.i. are required in order to force the molten thermoplastic through said capillaries. Commercial extruders are available which can deliver in excess of 1,000 pounds per hour at these pressures. No "plugging" occurs due to separation of fish-eyes, gel particles, or cross-linked polymer before the capillaries. At the pressures employed, the fish-eyes are forced into the capillaries with resultant deformation or breakage until they are the size of the capillaries themselves. Thus, the process is essentially continuous.

In order to obtain the repeated breakage of the gel particles which is required to reduce the particles to micron size, it is considered critical that the capillaries have an effective length of at least 0.05 inch. By the term "effective capillary length" as used herein and in the appended claims is meant, that length obtained by continuously following the tortuous path of a capillary on its meandering journey through the microporous bed. While the overall depth of the metal bed may be varied, care should be taken to avoid the use of extremely deep beds as they will increase the residence time of the thermoplastic material in said bed which can cause degradation of the thermoplastic material thus impairing the properties of the final product. In practice, it has been found that 0.60 inch effective capillary length is the maximum bed depth which can be used without degradation occurring. Operating within these limits results in an extremely short residence time of the thermoplastic material in the capillaries. Brief residence time affords minimum opportunity for heat build-up thereby eliminating any problem of heat dissipation. However, the upper limit can be made greater without undue fear of degradation provided that the equipment can provide sufficiently high pressure to maintain brief residence time of the molten thermoplastic in the capillaries. As can be appreciated by those in the art, the limits on bed depth are largely dependent upon the ability of the equipment to develop sufficiently high pressure to force the molten material through the sintered metal bed. Herein is found another reason for the success of the sintered metal plates; at high pressures, wire mesh screens and sand packs deform thereby restricting the throughput rate to almost an intolerable level, whereas because of the inherent rigidity and incompressibility of the sintered metal plates of the present invention, the process remains continuous regardless of the pressure.

The temperature of the molten thermoplastic during the reduction process can be advantageously maintained at temperatures near but preferably below the decomposition temperature of the resin. It is preferable to operate at the lowest viscosity consistent with the end use product requirements. As is commonly known, certain degrees of degradation are allowable and sometimes preferable in the final product. However, where no degradation products are desirable, temperatures below but still approaching the degradation point can be successfully used.

The gel reduction chamber embodied by the present invention is adapted to be interposed between the nozzle and die of conventional thermoforming systems, especially extruder and injection molding equipment. The reduction chamber is fromed by the complementary concentric recesses of the adjacent faces of flanged tube members, which are respectively attached through the flanged portions thereof to the nozzle and die of conventional thermoforming equipment. A sintered metal plate having tortuous passages extending therethrough is positioned within said reduction chamber and is maintained in such position by seals disposed perimetrically on the opposed faces of the sintered metal plate. A breaker plate is interposed between the sintered metal plate and the forward flanged tube member to give support during operation.

As the gel-containing thermoplastic material being extruded flows through the extruder nozzle, it passes under high pressure through the sintered metal plate, of critical pore size and capillary length, interposed as hereinabove described between the extruder nozzle and the extruder die whereby the gel particles are reduced to micron size thus assuring a product substantially free from visual fish-eyes and gel particles.

The examples presented hereinbelow show the results obtained by varying the critical factors of pore size, effective capillary length, and pressure. It can readily be seen that only when these parameters are with the ranges hereinbefore defined are products of commercial acceptability obtained.

The system of film ratings employed takes into account the inherent gel-containing properties of each thermoplastic. The rating system enables diverse resins to be compared on a common basis. For example, polyethylene oxide, having an inherently high fish-eye content, is considered commercially acceptable when containing 75 fish-eyes/ft.$^2$ of 0.001″ film; whereas, polyethylene, having a comparatively low inherent fish-eye content, is considered commercially acceptable when containing no more than 5 fish-eyes/ft.$^2$ of 0.001″ film.

Table I shows the rating system as applied to various thermoplastics.

TABLE I.—SYSTEM OF FILM RATING

| Rating | Material | | | | |
|---|---|---|---|---|---|
| | Polyethylene | Impact Polystyrene | Polyethylene Oxide | Polypropylene | Propylene/ ethylene methyl vinyl acetamide copolymer |
| | No. of Fish-eyes/1 ft.$^2$ of 0.001″ Film | | | | |
| Excellent | none | 5 | none | 1 | none |
| Very Good | 2 | 20 | 10 | 3 | 5 |
| Commercially acceptable | 5 | 30 | 75 | 5 | 15 |
| Poor | 10 | 40 | 150 | 10 | 30 |
| Very Poor | 20 | 50 | 500 | 25 | 50 |

Various thermoplastics having a high initial fish-eye or gel particle content were fluxed in a 1⅛", 2 hp. national Rubber Machinery extruder and forced through a sintered, stainless steel plate as described in the above specification.

Film samples having a thickness of 0.001 inch were visually examined over a unit area to determine the visual fish-eye or gel particle content after passage through the sintered metal plate.

It is noted in the following examples that only when all of the critical conditions hereinbefore defined are met, are films of commercial acceptability or better obtained.

*Examples 1 to 33*

A. Use of sintered stainless steel with an average capillary opening of 5 microns.

| Example No. | 1 | 2 | 3 | 4 | 5 | 6 | 7 |
|---|---|---|---|---|---|---|---|
| Average Capillary length, inches | 0.05 | 0.05 | 0.10 | 0.10 | 0.10 | 0.20 | 0.20 |
| Pressure, p.s.i. | 3,600 | 6,400 | 4,700 | 7,000 | 8,300 | 7,900 | 9,800 |
| Film rating | Poor | Very Good | Poor | Very Good | Very Good | Very Good | Very Good |

B. Use of sintered stainless steel with an average capillary opening of 10 microns.

| Example No. | 8 | 9 | 10 | 11 | 12 | 13 | 14 |
|---|---|---|---|---|---|---|---|
| Average Capillary length, inches | 0.05 | 0.10 | 0.10 | 0.10 | 0.20 | 0.20 | 0.20 |
| Pressure, p.s.i. | 2,000 | 4,700 | 6,000 | 7,100 | 6,000 | 8,000 | 8,700 |
| Film rating | Very Poor | Poor | Commer. Accept. | Commer. Accept. | Good | Very Good | Very Good |

C. Use of sintered stainless steel with an average capillary opening of 20 microns.

| Example No. | 15 | 16 | 17 |
|---|---|---|---|
| Average Capillary length, inches | 0.20 | 0.20 | 0.20 |
| Pressure, p.s.i. | 5,000 | 6,900 | 8,000 |
| Film rating | Poor | Commer. Accept. | Commer. Accept. |

D. Use of a combination of two sintered stainless steel elements. One element has an average capillary opening of 5 microns and the other 10 microns.

| Example No. | 18 | 19 | 20 |
|---|---|---|---|
| Average Capillary length (2 elements), inches | 0.10 | 0.10 | 0.10 |
| Pressure, p.s.i. | 4,800 | 6,000 | 7,800 |
| Film rating | Poor | Very Good | Very Good |

E. Use of a fine wire mesh screen, a combination of fine wire mesh screens, and a sintered stainless steel filter having an average capillary opening of 165 microns which is greater than that critically defined in the present invention.

| Example No. | 21 | 22 | 23 |
|---|---|---|---|
| Type of Filter | One 400 mesh screen. | Two 200 mesh screen. | One stainless steel filter-average capillary opening 165 microns. |
| Average Capillary length, inches. |  |  | 0.20. |
| Pressure, p.s.i. | 2,600 | 2,700 | 3,100. |
| Film rating | Very Poor | Very Poor | Very Poor. |

F. A series of experiments were made to determine if pressure alone would reduce fish-eyes.

*Example 24*

Low-pressure polyethylene as used in Example 1 was passed in a molten form through a 0.0225 inch diameter hole located in the middle of a ⅛" thick plate. The plate replaced the sintered stainless steel plate used in Example 1. The pressures were varied from 4,000 p.s.i. by changing the screw speed of the extruder. No fish-eye or gel reduction was observed at any condition when the plate with the hole in the middle was used.

Low pressure polyethylene as used in Example 1 was passed in a molten form through sintered stainless steel plates having average pore openings of 10 microns and various bed depths. It was found that the thickness of the bed depth is effectively limited by the ability of the extruder to develop sufficiently high pressure to force the extrudate through the bed as shown in Examples 25 and 26.

G. Use of 10 micron stainless steel plates of various bed depths:

| Example No. | 25 | 26 |
|---|---|---|
| Average Capillary length, inches. | 0.40 | 0.60. |
| Pressure, p.s.i. | 8,900 | >10,000. |
| Film rating | Very Good | Extruder could not feed at the high pressure. |

The applicability of the present invention to improving the visual appearance of gel-containing thermoplastics is illustrated by reference to the results shown below:

H. Fish-eye reduction of various thermoplastic resins using sintered metal.

| Example No. | 27 | 28 | 29 | 30 | 31 | 32 | 33 |
|---|---|---|---|---|---|---|---|
| Material | Impact Polystyrene containing 8% GRS Rubber | | Polyethylene Oxide | | Polypropylene/ Ethylene-Methyl vinylacetamide Copolymer | Poly(propylene) | |
| Average Capillary length, inches | 0.20 | 0.10 | 0.20 | 0.10 | 0.20 | 0.20 | 0.20. |
| Average Capillary opening, microns | 10 | 5 | 35 | 35 | 10 | 10 | 10. |
| Pressure, p.s.i. | 9,700 | 8,800 | 5,700 | 8,800 | 7,400 | 7,600 | 7,500. |
| Film Rating | Commercially Acceptable. | Commercially Acceptable. | Very Good | Very Good | Very Good | Very Good | Very Good |

While it is obvious that there is no exact correlation between effective capillary length and actual bed depth, the average capillary length is a function of the actual bed depth: average capillary length $$(L) = \frac{\pi}{2} D$$

wherein D is the bed depth, therefore $$D = \frac{2}{\pi} L$$

This equation enables the actual bed depth or thickness of the sintered metal plate to be determined. Therefore, the average capillary length rather than the effective capillary length has, as a practical measure, been used in the foregoing examples as an experimental parameter.

The process and apparatus of the present invention has been found to be especially useful for fish-eye and gel reduction in such thermoplastics as polyethylene, polypropylene, polystyrene, polyhydroxyethers, polyalkylene oxides, vinyl homopolymers and copolymers, propylene/ethylene copolymers, polypropylene/ethylene methyl vinylacetamide copolymers, and such other thermoplastic homopolymers and copolymers containing fish-eyes and gels.

The elements of the present invention have been found to be suitably adaptable to such other uses as: carbon black dispersion, control of cell size and distribution in plastic foams, pigment dispersion in thermoplastic resins during extrusion and injection molding, control of particle size and distributions in latexes, improved dispersions of one polymer in another, improved dispersion of a solid organic material in a liquid organic material, and improved dispersion of one or more liquid organic material in one or more other liquid organic materials.

What is claimed is:

1. In a thermoforming process wherein a gel-containing thermoplastic is forced through a shaping nozzle at elevated temperatures, the step which comprises forcing the gel particles and the molten thermoplastic containing said particles prior to contact with said shaping nozzle, through the capillaries of a rigid, noncompressible, metallurgically-bonded microporous, metallic bed, said capillaries having an average pore diameter between about 2 to 35 microns and effective capillary lengths of at least 0.05 inch under the influence of pressure greater than at least 5,500 p.s.i., to reduce the gel particles to micron size thereby escaping visual detection in the shaped product.

2. In a thermoforming process wherein a gel-containing thermoplastic is forced through a shaping nozzle at elevated temperatures, the step which comprises forcing the gel particles and the molten thermoplastic containing said particles at temperatures near and slightly below the decomposition temperature of the thermoplastic, prior to contact with said shaping nozzle, through the capillaries of a rigid, noncompressible, metallurgically-bonded microporous, metallic bed, said capillaries having an average pore diameter between about 2 to 35 microns and effective capillary lengths of at least 0.05 inch under the influence of pressures of from about 5,500 to about 10,000 p.s.i., to reduce the gel particles to micron size thereby escaping visual detection in the shaped product.

3. In a thermoforming process wherein a gel-containing thermoplastic is forced through a shaping nozzle at elevated temperatures, the step which comprises forcing the gel particles and the molten thermoplastic containing said particles at temperatures near and slightly below the decomposition temperature of the thermoplastic prior to contact with said shaping nozzle, through the capillaries of at least one rigid, noncompressible, microporous, sintered stainless steel bed, said capillaries having an average pore diameter between about 2 to 35 microns and effective capillary lengths of from about 0.05 inch to about 0.60 inch under the influence of pressure of from about 5,500 p.s.i., to about 10,000 p.s.i., to reduce the gel particles to micron size thereby escaping detection in the shaped product.

4. In an extrusion process wherein a gel-containing polyethylene is forced through a shaping nozzle at temperatures between about 250° to 300° C., the step which comprises forcing the gel particles and the molten polyethylene containing said particles prior to contact with said shaping nozzle, through the capillaries of a rigid, non-compressible, microporous, sintered stainless steel bed, said capillaries having an average pore size between about 5 to 15 microns and an effective capillary length of about 0.20 inch under the influence of pressures greater than at least 6,000 p.s.i., to reduce the gel particles to micron size thereby escaping visual detection in the shaped polyethylene product.

References Cited by the Examiner

UNITED STATES PATENTS

| | | | |
|---|---|---|---|
| 2,507,591 | 5/50 | Cox | 18—8 |
| 2,513,795 | 7/50 | Gliss | 18—12 |
| 2,600,686 | 6/52 | Piperoux et al. | 18—12 |
| 2,607,954 | 8/52 | Schneider et al. | 18—12 |

FOREIGN PATENTS 8571,121  12/60  Great Britain.

ALEXANDER H. BRODMERKEL, *Primary Examiner.*

MICHAEL V. BRINDISI, *Examiner.*